(12) United States Patent
Adler

(10) Patent No.: US 6,607,187 B1
(45) Date of Patent: Aug. 19, 2003

(54) BOARD FOR ROLLING DOUGH

(76) Inventor: Robert C. Adler, 9665 Wilshire Blvd., Suite 520, Beverly Hills, CA (US) 90212-2312

( * ) Notice: Subject to any disclaimer, the term of this patent is extended or adjusted under 35 U.S.C. 154(b) by 0 days.

(21) Appl. No.: 09/631,572

(22) Filed: Aug. 4, 2000

Related U.S. Application Data

(60) Provisional application No. 60/147,124, filed on Aug. 4, 1999.

(51) Int. Cl.$^7$ ................................................ B23Q 3/00
(52) U.S. Cl. ..................................... 269/302.1; 269/302
(58) Field of Search ......................... 269/302.1, 289 R, 269/302; 220/551, 550; 248/346.06, 346.07, 346.01, 346.02; 211/190, 187, 189, 184, 90.02, 208; 249/158, 155; 206/600; 108/107, 109, 144.11

(56) References Cited

U.S. PATENT DOCUMENTS

| | | | | | |
|---|---|---|---|---|---|
| 120,394 | A | * | 10/1871 | Petterson | 269/302.1 |
| 529,706 | A | * | 11/1894 | Carpenter | 269/302.1 |
| 2,181,666 | A | * | 11/1939 | Molin | 107/46 |
| 3,736,088 | A | * | 5/1973 | Jimenez | 269/302.1 |
| D227,642 | S | * | 7/1973 | Daenen | D7/698 |
| 3,972,318 | A | * | 8/1976 | Lenoir | 269/302.1 |
| 4,024,287 | A | * | 5/1977 | Golchert | 269/302.1 |
| D250,383 | S | * | 11/1978 | Ceccarelli | D7/698 |
| D253,449 | S | * | 11/1979 | Fritz | D7/698 |
| 5,366,208 | A | * | 11/1994 | Benjamin | 269/302.1 |
| D373,054 | S | * | 8/1996 | Joergensen | D7/698 |
| 5,800,853 | A | * | 9/1998 | Wang | 269/302.1 |
| 5,865,105 | A | * | 2/1999 | Pepelanov | 269/302.1 |

* cited by examiner

Primary Examiner—Lee D. Wilson
(74) Attorney, Agent, or Firm—Christie, Parker & Hale, LLP

(57) ABSTRACT

A board for rolling dough comprising a generally flat rectangular board, preferably wood, with an elevated rail system on the surface of at least one side of the board that consists of a raised lip around the perimeter. The invention can be used with a rolling pin that is long enough to straddle parallel sides of the elevated railing. When the user rolls the rolling pin across the elevated railing, the rolling pin flattens the dough to a thickness corresponding to the height of the railing measured relative to the surface of the board.

19 Claims, 4 Drawing Sheets

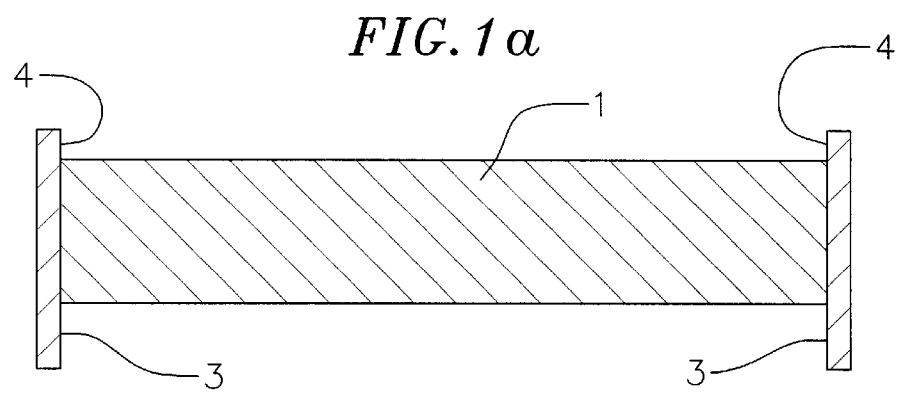
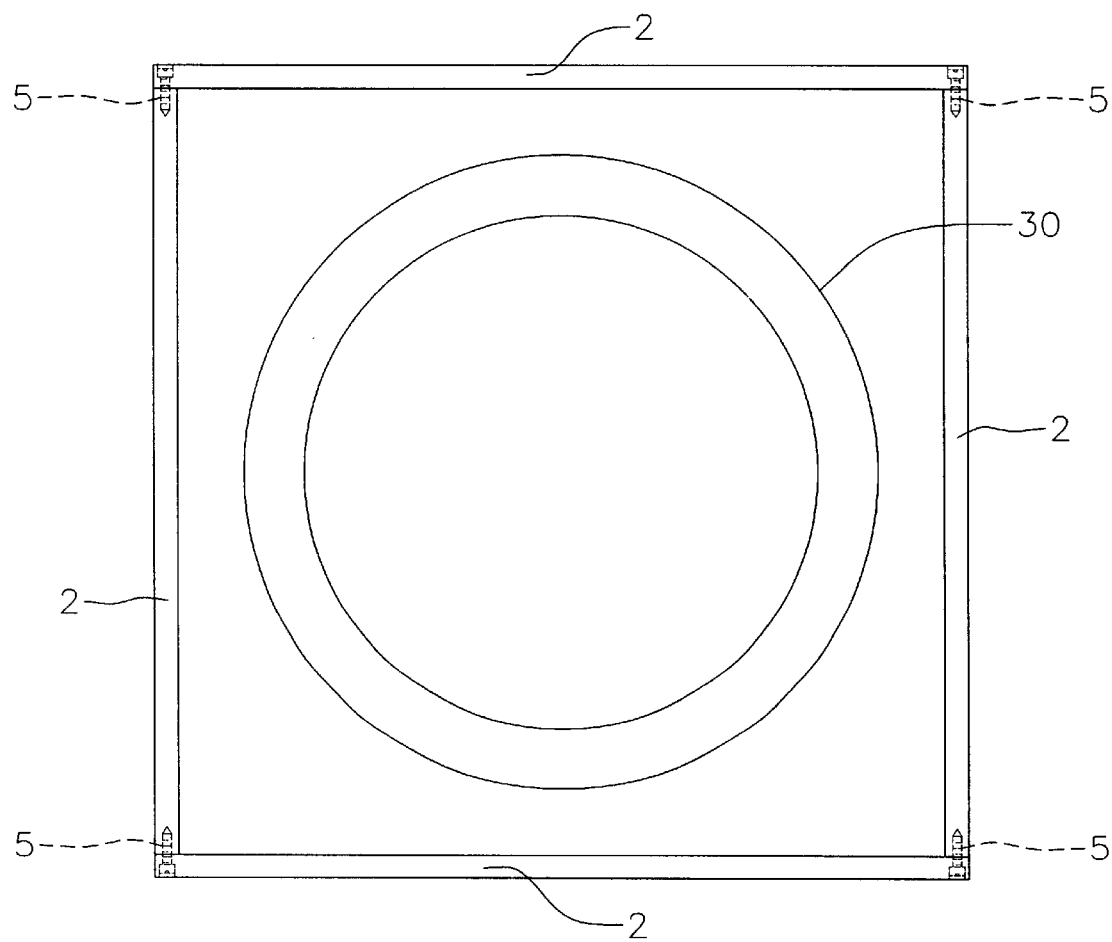

BOARD FOR ROLLING DOUGH

CROSS-REFERENCE TO RELATED APPLICATION

This application is based on U.S. Provisional Application No. 60/147,124, filed Aug. 4, 1999, the disclosure of which is incorporated herein by reference.

FIELD OF THE INVENTION

The present invention relates to an improved board for rolling dough and preparing food.

BACKGROUND OF THE INVENTION

In the course of food preparation, it is often desirable to roll dough evenly and to a specific thickness. However, the use of a rolling pin and a flat surface often results in rolled dough with undesirable holes, thick spots, or stretched regions.

Conventional kitchen cutting boards to not have features that help a user roll dough evenly every time. Nor do they have mechanisms that allow a user to accurately control the thickness or diameter of the rolled dough, or confidently pre-select the end thickness of the rolled dough before beginning to roll it.

SUMMARY OF THE INVENTION

The present invention allows a user to evenly roll dough to a predetermined thickness. It also allows a user to control the diameter of the rolled dough. The invention comprises a generally flat rectangular board, preferably wood, with an elevated rail system on the surface of at least one side of the board that consists of a raised lip around the perimeter. The invention can be used with a rolling pin that is long enough to straddle parallel sides of the elevated railing. When the user rolls the rolling pin across the elevated railing, the rolling pin flattens the dough to a thickness corresponding to the height of the railing measured relative to the surface of the board.

One preferred embodiment of the invention has fixed railings on each side of the board so that each side is capable of producing rolled dough with a different thickness. Another preferred embodiment has a railing that the user can adjust to heights of 0.0 inch, 0.125 inch, 0.25 inch or 0.5 inch relative to the surface of the board. This enables the user to pre-select how thick the rolled dough will be. The preferred embodiments also have concentric circular grooves or markings in or on the surface of the boards which enable the user to roll the dough to specific diameters. The invention can also be used as a cutting board, preferably on the reverse side.

BRIEF DESCRIPTION OF THE DRAWINGS

These and other features and advantages of the present invention will be better understood by reference to the following detailed description when considered in conjunction with the accompanying drawings wherein:

FIG. 1a is a side cross-sectional view of a non-adjustable embodiment of the invention.

FIG. 1b is a plan view of the non-adjustable embodiment shown in FIG. 1a.

FIG. 2b is a side view of the adjustable embodiment shown in FIG. 2a.

FIG. 3 is a side cross-sectional view of the adjustable embodiment shown in FIG. 2a.

DETAILED DESCRIPTION OF THE INVENTION

Figure 2A:
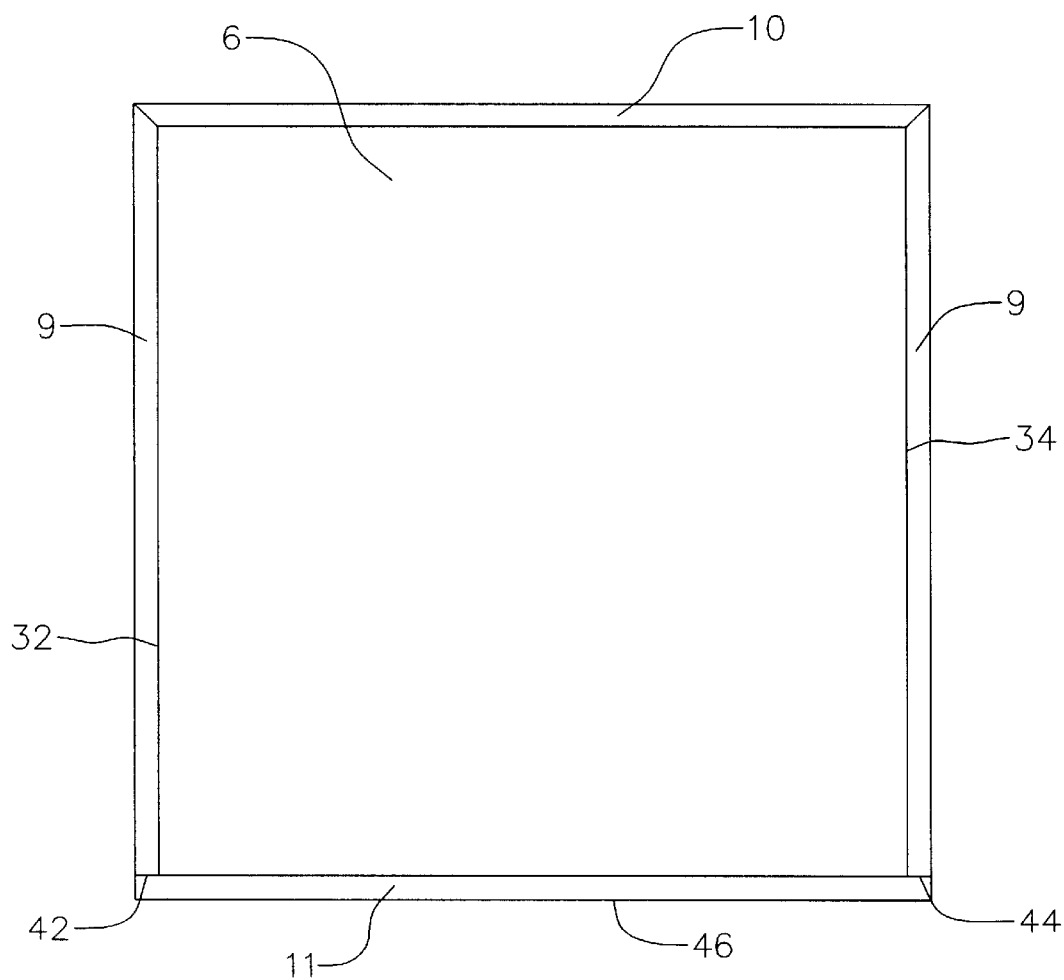
FIG. 2a is a plan view of an adjustable embodiment of the invention.

One preferred embodiment of the invention has a fixed railing. Referring to FIGS. 1a and 1b, the embodiment comprises a wooden board 1 and four wooden rails or panels 2. When fully assembled, the outer plan dimensions of this embodiment register 15 inches square. Although this particular embodiment is made of wood, the invention can also be made with any other durable, non-toxic material that can be wiped clean. Birch wood is presently preferred but other materials such as maple wood, polyethylene or acrylic can also be used.

Referring to FIG. 1b, the board 1 and rails 2 are rectangular in shape and generally flat. Preferably the board 1 is 14 inches-by-14 inches, 1 inch thick (FIG. 1a), and properly treated in accordance with Food and Drug Administration (FDA) standards. The dimensions of the board surface allow the user to roll out reasonably large sheets of dough, but any board size large enough to produce a usable sheet of dough will suffice. For instance, a board with dimensions of 9 inches-by-9 inches can also be incorporated into an embodiment of the invention; fully assembled, the outer plan dimensions of such an embodiment would measure 10 inches-by-10 inches.

The preferred thickness of the board 1 makes it sturdy, but any thickness that makes the board 1 strong enough to withstand the rigors of rolling dough could be used instead. In other embodiments, the thickness of the board 1 may be reduced to reduce the overall profile and weight of the rolling board.

Referring to FIG. 1b, preferably, the surface of at least one side of the board 1 is engraved with concentric, generally circular grooves 30, or possesses concentric circular markings or other visible indicia that allow a user to assess the dimensions of rolled dough by referencing the board 1. The diameters of the grooves 30 or markings are selected to yield popular and reasonably sized circles of dough. For instance, the diameters of the circles might be ten, twelve, and fourteen inches, though the number of circles need not be limited to three and the dimensions need not conform to those enumerated.

Referring now to FIGS. 1a and 1b, the four rails 2 are preferably each 14.5 inches long and 0.5 inch thick. Although the rails are 14.5 inches long and 0.5 inch thick in this embodiment, the dimensions of the rails can be 9 to 15.5 inches long and can, alternatively, be 0.75 inch thick. It is preferable that all the rails 2 measure either 1.375 inches or 1.625 inches wide. The rails 2 are assembled around the edges of the wooden board 1 so as to create a uniform 0.25 inch raised lip 3 around the perimeter on one side (the top or bottom) of the board 1. This leaves a uniform 0.125 inch or 0.375 inch (corresponding to rails with widths of 1.375 inches or 1.625 inches respectively) base 4 around the perimeter on the opposite side of the board 1. The raised lip 3 around the perimeter on each side of the board 1 constitutes an elevated railing on which a rolling pin can glide.

Referring to FIG. 1b, the rails 2 are preferably attached to each other and to the board 1. It is preferable to attach the rails 2 to each other with a screw 5 at each corner. These screws can be countersunk and covered with wood caps in order to enhance the appearance of the board 1. However, the rails 2 can be also attached to each other and to the board 1 with any suitable chemical or mechanical fixative including adhesive or nails.

Figure 2B:
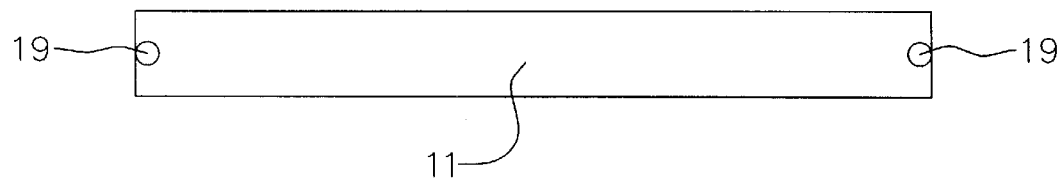
Figure 3:
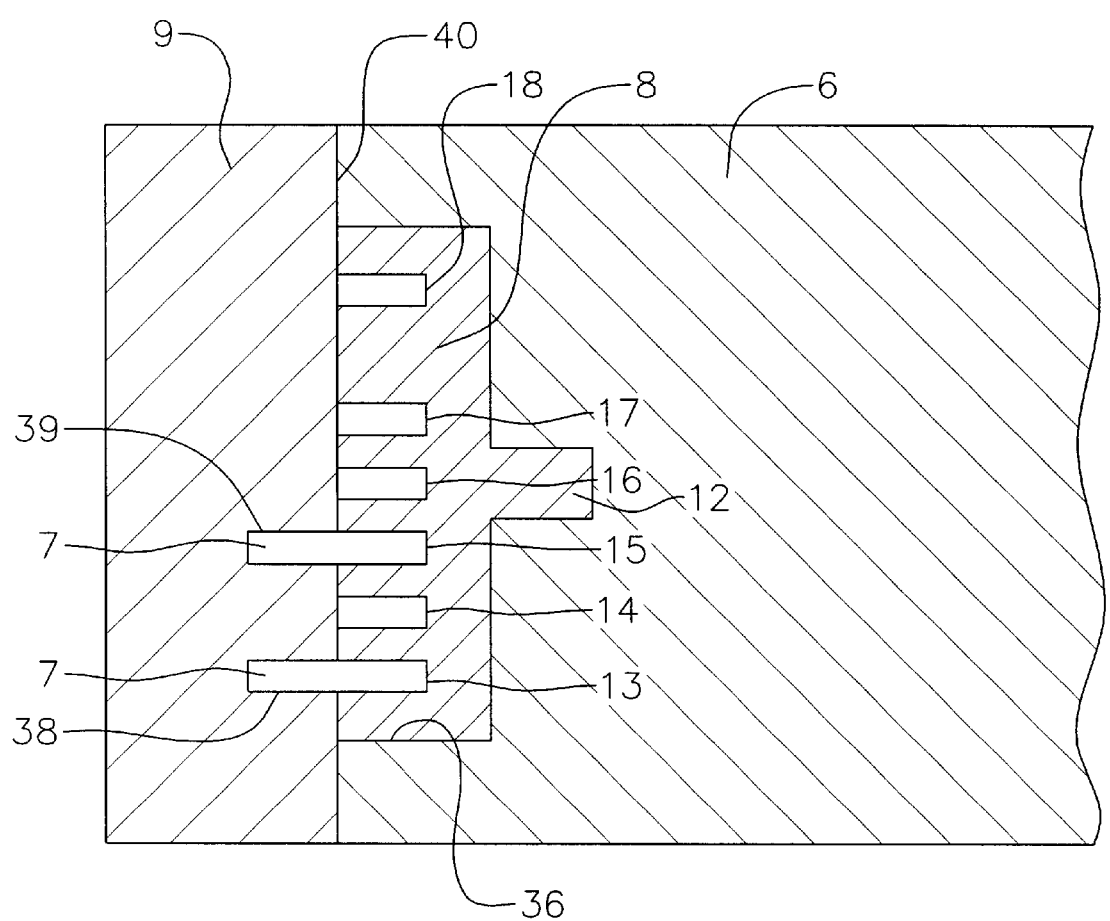
Figure 4:
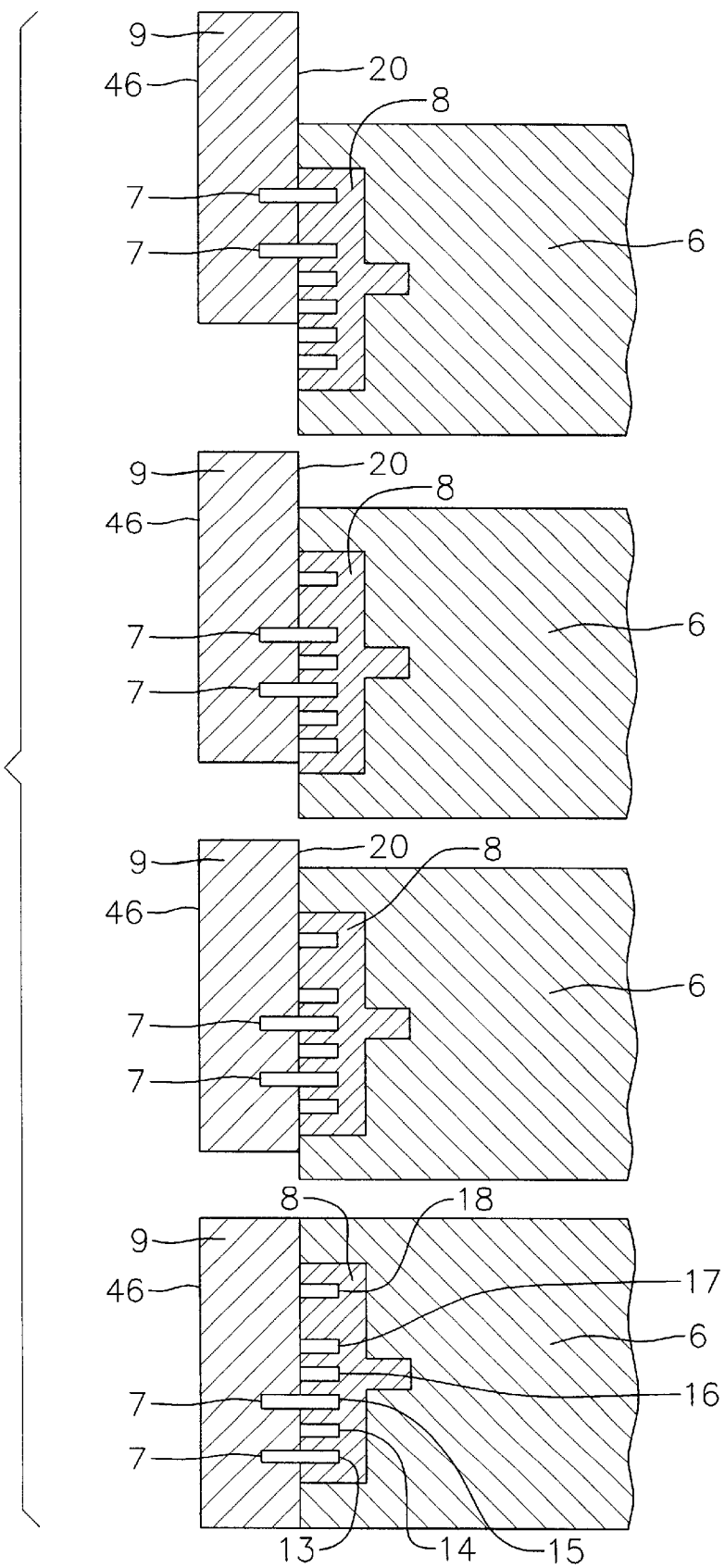
FIG. 4 is a side cross-sectional view, along the line A—A, of the adjustable embodiment shown in FIG. 2a, showing four configurations yielding four different rail heights relative to the surface of the board.

Another preferred embodiment of the invention is shown in FIGS. 2 to 4. In this embodiment, the height of the elevated railing relative to the surface of the board can be adjusted. Referring now to FIG. 2a, the adjustable embodiment consists of a wooden board 6, a pair of wooden side rails 9, a wooden rear rail 10 and wooden front panel 11. The embodiment further comprises a four plastic tongues or fins 7 and two plastic grooved inserts 8. When fully assembled, the outer plan dimensions of this embodiment register 16 inches-by-16 inches. Although the board 6 and rails 9, 10 and 11 in this particular embodiments are made of wood, these components can also be made with any other durable, non-toxic material that can be wiped clean. Birch wood is presently preferred but other materials such as maple wood, polyethylene or acrylic can also be used. The plastic components can be made from polyvinyl chloride (PVC) or any other other durable, non-toxic extrudable material that can be wiped clean.

The boards 6 and rails 9, 10 and 11 are rectangular in shape and generally flat. Preferably the board 6 is 15 inches-by-15 inches, 1.0 to 1.5 inches thick, and properly treated in accordance with FDA standards. The dimensions of the board 6 surface allow the user to roll out reasonably large sheets of dough, but any board size large enough to produce a usable sheet of dough will suffice. The preferred thickness of the board makes it sturdy, but any thickness that makes the board 6 strong enough to withstand the rigors of rolling dough can also be used.

Preferably, the surface of at least one side of the board 6 is engraved with concentric, generally circular grooves, or possesses concentric circular markings or other visible indicia (not shown) that allow a user to assess the dimensions of rolled dough by looking at the board 6. The diameters of the grooves or markings are selected to yield popular and reasonably sized circles of dough. For instance, the diameters of the circles might be ten, twelve, and fourteen inches, though the number of circles need not be limited to three and the dimensions do not need to conform to those enumerated.

The three rails 9 and 10 and front panel 11 are preferably each 1.5 inches wide and 0.5 inch thick with side rails 9 measuring 15.5 inches 9 and the rear rail 10 and front panel 11 measuring 16 inches in length respectively. Although the rails 9 and 10 and front panel 11 are 15.5 and 16 inches long and 0.5 inch thick in this embodiment, they can be 0.75 inch thick and 15.75 and 16.5 inches in length respectively; this would make the outer overall plan dimensions of the fully assembled embodiment register 16.5 inches-by-16.5 inches. Preferably each side rail 9 is beveled at a 45 degree angle (with respect to the longitudinal axis of the rail) at one end ad the rear rail 10 is beveled at a 45 degree angle (with respect to the longitudinal axis) at both ends. These three beveled rails are assembled to make a U-shaped frame, as shown in FIG. 2a, by mating their beveled ends such that the rear rail 10 is in the horizontal position of the U. Though beveling is used in this embodiment, the ends of the rails can also be fashioned without beveling and thus can be joined in other geometric configurations. Preferably, the non-beveled ends of the side rails 9 are hollowed out to receive metal threaded inserts which are secured inside the rails 9. The rails 9 and 10 can be attached to each other with any suitable chemical or mechanical fixative. For example, they may be attached using adhesive, screws, or nails.

Referring to FIG. 3, the plastic tongues 7 and plastic grooved inserts 8 are generally rectangular. The tongues 7 are preferably 15 inches long, 0.439 inch wide and 0.063 inch thick. Preferably the grooved insert 8 is 15 inches long, 0.314 inch wide, 1.070 inches thick and has a 0.25 inch-long tab 12 extending lengthwise across one of the 1.070 inches-by-15 inches faces. The other 1.070 inches-by-15 inches face preferably has six notches 13, 14, 15, 16, 17 and 18 extending along its length. Preferably these notches are 0.063 inch high, and 0.189 inch deep. The first notch 13 is preferably positioned 0.125 inch from the bottom of the grooved insert 8. The next notch 14 is preferably spaced 0.063 inch above the first notch 13 and is followed by the third notch 15, fourth notch 16 and fifth notch 17, each spaced 0.063 inch apart. The sixth notch 18 is located 0.189 inch above the fifth notch 17. Although six notches are present in the preferred embodiment described, other numbers of notches and the spacings may be used to achieve the desired number and height of various height adjustments. For example, four notches may be used.

Referring to FIG. 2a, two edges 32 and 34 of the wooden board 6 are hollowed out (FIG. 3) along their lengths in the shape of the lengthwise end-to-end profile of the grooved insert 8 (oriented so the tab points towards the center of the board on each side) forming a cavity 36. Referring now to FIG. 3, preferably, the hollowed-out portion or cavity 36 is positioned 0.215 inch from the bottom of the board 6. The grooved inserts 8 are firmly seated in the insert-shaped cavities 36 and fixedly attached to the board 6 in some suitable way. For example, the insert 8 may be fixedly attached to the board 6 using an adhesive or a compression fit.

Each side rail 9 has first and second rail grooves 38 and 39 extending along the length of its inner edge 40. The rail grooves 38 and 39 are preferably 0.063 inch high and 0.25 inch deep. Preferably the first rail groove 38 is positioned 0.340 inch from the bottom of each side rail 9 and the second rail groove 39 is spaced 0.189 inch above the first 38. The plastic tongues 7 are firmly seated in the rail grooves 38 and 39 and fixedly attached to the side rail 9 in some suitable way. For example, the tongues 7 may be fixedly attached to the side rail 9 using adhesive or a compression fit. Although this particular adjustable embodiment has two plastic tongues 7 on each side, in a more preferred embodiment, one tongue 7 may be attached to each of the side rails 9. Consequently, it is also only necessary to have one set of grooves extending along the length of each side rail 9.

Since the tongues 7 are 0.439 inch wide and the grooves 38 and 39 in the side rails 9 are only 0.25 inch deep, each tongue 7 extends out 0.189 inch beyond the inner edge 40 of the side rail 9. The distance that the tongues 7 extend beyond the rails 9 corresponds precisely to the depths of the grooves 38 and 39 in the plastic inserts 8 that are fixedly attached to the wooden board 6. Thus, the tongues 7 on the U-shaped frame can be guided into the grooves 38 and 39 on both sides of the board 6 and the frame can slide into contact with the board 6. Referring now to FIG. 2a, once the U-shaped frame couches the board 6, the remaining front panel 11 can be attached to two free ends 42 and 44 of the frame. This caps the U-frame, converting it to a box frame 46 which holds the board 6 captive. Referring now to FIG. 2b, The front panel 11 can be attached to the U-frame with two metal thumbscrews 19 which pass through the front panel 11 and are received by the threaded inserts in the ends 42 and 44 of the two legs of the U-frame.

Referring to FIG. 4, when the tongues 7 of the box frame 46 engage the first 13 and third 15 notches of the board 6, the box frame 46 lines up flush with the top and bottom of the board 6. When the tongues 7 are engaged with the second 14 and fourth 16 notches, the box frame 46 extends above the surface of the board 6 forming a raised lip 20 around the perimeter approximately 0.125 inch high relative to the top surface of the board 6. This raised lip 20 constitutes an elevated railing on which a rolling pin can glide. The height of the railing relative to the top surface of the board 6 can be adjusted as shown in FIG. 4 by removing the thumb-screws 19 from the front panel 11, sliding the U-shaped frame off of the board 6, sliding the frame into different notches in the board 6, and replacing the front panel 11. When the tongues 7 engage the third 15 and fifth 17 notches the railing extends approximately 0.25 inch above the top surface of the board 6. The railing extends approximately 0.5 inch above the surface when the fourth 16 and sixth 18 notches are engaged. Accordingly, the height of the raised railing can be adjusted to settings of 0.0 inches, 0.125 inches, 0.25 inches, 0.375 inches and 0.5 inches, respectively. In addition, the tongues 7 and notches 13, 14, 15, 16, 17 and 18 may be color-coded to correspond to the various settings.

The invention can be used with a rolling pin that is long enough to straddle parallel sides of the elevated railing. When the user rolls the rolling pin across the elevated railing the rolling pin flattens the dough to a thickness corresponding to the height of the railing measured relative to the surface of the board 6. Preferably, either side of the invention can also be used as a cutting board.

The preceding description has been presented with reference to presently preferred embodiments of the invention. Workers skilled in the art and technology to which this invention pertains will appreciate that alteration and changes in the described structure may be practiced without meaningfully departing from the principal, spirit, and scope of this invention.

What is claimed is:

1. A rolling board comprising:
a planar element having a perimeter and a substantially flat top surface; and a rail having a substantially flat top surface, said rail having an open section allowing it to be slid, in a plane substantially parallel to the substantially flat top surface of the planar element, around a portion of the perimeter of the planar element, and being slidably, removably attached to the perimeter of the planar element such that the top face of said rail is parallel to and raised a predetermined distance apart from the top surface of the planar element, forming a lip, wherein said rail has a fixedly attached coupling to a side of said rail for connecting to at least one groove of said planar element.

2. The rolling board of claim 1 wherein the planar element is a substantially rectangular wooden plate having dimension about 15 inches in width and length and thickness of about 1 inch.

3. The rolling board of claim 1 wherein the top surface of the planar element is engraved with a plurality of concentric, generally circular grooves corresponding to various dimensional radii.

4. The rolling board of claim 1 wherein the predetermined distance between the top face of the at least one rail and the top surface of the planar element is fixed between about 0.3 inches to about 0.5 inches.

5. The rolling board of claim 1 wherein the top surface of the planar element is engraved with a plurality of concentric circular markings corresponding to various dimensional radii.

6. A rolling board comprising:
a plate having a perimeter and a substantially flat top surface;
a U-shaped frame having a substantially flat top face and planar sidewalls, having an open section allowing it to be slid, in a plane substantially parallel to the substantially flat top surface of the plate, around a portion of the perimeter of the plate, and adjustably coupled to the perimeter of the plate such that the top face of the U-shaped frame is parallel to and raised an adjustable linear distance apart from the top surface of the plate; and
a coupling fixedly attached to an inner side of said U-shaped frame for adjusting the linear distance between the top face of the U-shaped frame and the top surface of the plate with said coupling connecting to at least one groove of said plate.

7. The rolling board of claim 6 wherein the plate comprises wood having dimension about 15 inches in width and length and thickness of about 1 inch.

8. The rolling board of claim 6 further comprising a panel removably attached to at least one sidewall for enclosing the frame about the plate perimeter.

9. The rolling board of claim 6 wherein the coupling is a tongue and groove connection.

10. The rolling board of claim 6 wherein the distance between the top face of the U-shaped frame and the top surface of the plate is adjustable between about 0.0 inches to about 0.5 inches.

11. The rolling board of claim 6 wherein the top surface of the plate is engraved with a plurality of concentric, generally circular grooves corresponding to various dimensional radii.

12. The rolling board of claim 6 wherein the top surface of the plate is engraved with a plurality of concentric circular markings corresponding to various dimensional radii.

13. A rolling board for preparing food, comprising:
a plate having a perimeter and a substantially flat top surface;
a plurality of panels having substantially flat top faces and planar sidewalls adjustably coupled to the perimeter of the plate such that the top faces of the panels are parallel to and raised an adjustable linear distance apart from the top surface of the plate; and
a coupling fixedly attached to said plate for adjusting the linear distance between the top faces and the top surface; the coupling connecting to at least one groove of said plurality of panels.

14. The rolling board of claim 13 wherein the plate comprises wood having dimension about 15 inches in width and length and thickness of about 1 inch.

15. The rolling board of claim 13 wherein the plurality of panels are assembled forming a frame about the perimeter of the plate.

16. The rolling board of claim 13 wherein the coupling is a tongue and groove connection.

17. The rolling board of claim 13 wherein the distance between the top faces of the panels and the top surface of the plate is adjustable between about 0.0 inches to about 0.5 inches.

18. The rolling board of claim 13 wherein the top surface of the plate is engraved with a plurality of concentric, generally circular grooves corresponding to various dimensional radii.

19. The rolling board of claim 13 wherein the top surface of the plate is engraved with a plurality of concentric circular markings corresponding to various dimensional radii.

* * * * *